United States Patent
Iguchi

(10) Patent No.: US 8,256,843 B2
(45) Date of Patent: Sep. 4, 2012

(54) VEHICLE SEAT RECLINING DEVICE

(75) Inventor: Daisuke Iguchi, Hamamatsu (JP)

(73) Assignee: Fuji Kiko Co., Ltd., Kosai-shi (JP)

( * ) Notice: Subject to any disclaimer, the term of this patent is extended or adjusted under 35 U.S.C. 154(b) by 318 days.

(21) Appl. No.: 12/684,423

(22) Filed: Jan. 8, 2010

(65) Prior Publication Data

US 2010/0194165 A1 Aug. 5, 2010

(30) Foreign Application Priority Data

Jan. 30, 2009 (JP) ................................ 2009-019398

(51) Int. Cl.
*B60N 2/235* (2006.01)
*B23P 11/02* (2006.01)

(52) U.S. Cl. .................... 297/367 P; 297/367 R; 29/446

(58) Field of Classification Search .............. 297/367 P, 297/367 R; 29/446
See application file for complete search history.

(56) References Cited

U.S. PATENT DOCUMENTS

| 5,681,086 A | 10/1997 | Baloche | |
| 7,766,429 B2 * | 8/2010 | Kuroda et al. | 297/367 P |
| 7,784,872 B2 * | 8/2010 | Kienke et al. | 297/367 P |
| 7,819,471 B2 * | 10/2010 | Ishihara et al. | 297/216.13 |
| 2008/0203799 A1 | 8/2008 | Yamada | |

FOREIGN PATENT DOCUMENTS

| JP | 8-253063 A | 10/1996 |
| JP | 2008-212176 A | 9/2008 |

* cited by examiner

*Primary Examiner* — Milton Nelson, Jr.
(74) *Attorney, Agent, or Firm* — Foley & Lardner LLP

(57) ABSTRACT

A seat reclining device has a torsion spring for a cam, and a plurality of guide-protrusion pairs formed integral with the inside face of a stationary member for guiding movement of tooth blocks into and out of meshed-engagement with an internal tooth of a movable member. Two opposing circular-arc concave portions are formed on opposing faces of two circumferentially adjacent guide-protrusion sets. A space between the concave portions is dimensioned to be wider on a radially outward side for defining a spring accommodation space, and dimensioned to be narrower on a radially inward side for forming circumferentially-opposing convex portions. Two spring hooks engage with the respective convex portions under preload. One of the hooks is also engaged with the cam for forcing it in its locked direction. An anti-rotation protrusion is formed on the outside face of the stationary member at a position conforming to the spring accommodation space.

6 Claims, 6 Drawing Sheets

US 8,256,843 B2

VEHICLE SEAT RECLINING DEVICE

TECHNICAL FIELD

The present invention relates to a vehicle seat reclining device configured to enable angular position adjustment of a seatback relative to a seat cushion in an unlocked state of lock tooth blocks displaceable by a cam and also configured to hold the relative angular position of the seatback in a locked state of the lock tooth blocks, and specifically to the improvement of a supporting structure of a spring by which the cam is permanently biased so that the lock tooth blocks are forced toward their locked positions.

BACKGROUND ART

A car seat is generally equipped with a seat reclining device by which an angular position of a seatback with respect to a seat cushion can be varied. One such vehicle seat reclining device has been disclosed in Japanese Patent Provisional Publication No. 2008-212176 (hereinafter is referred to as "JP2008-212176"), corresponding to United States Patent Application Publication No. US 2008/0203799 A1, published Aug. 28, 2008 and assigned to the assignee of the present invention. The seat reclining device, disclosed in JP2008-212176, includes a pair of base brackets fixedly connected to respective sides of a seat cushion, and a pair of arm brackets fixedly connected to respective sides of a seatback. A base-side disk-shaped case is fixedly connected to the associated base bracket, whereas an arm-side disk-shaped case is fixedly connected to the associated arm bracket. The base-side case and the arm-side case are assembled to each other by means of a ring-shaped holder in such a manner as to restrict axial movement of these cases and to permit rotary motion of the arm-side case relative to the base-side case. A pair of lock tooth blocks are installed in the base-side case in such a manner that the lock tooth blocks can pivot about respective tooth-block supporting portions (respective tooth-block pivots). A [spring-loaded] cam member, which is permanently biased by means of a pair of lock springs, acts to force the lock tooth blocks toward their locked positions. By virtue of rotary motion of the [spring-loaded] cam in one rotational direction, the external toothed portion of each of the lock tooth blocks is brought into meshed-engagement with the internal toothed portion formed on the inner periphery of the arm-side case. With the external and internal toothed portions meshed with each other, the arm-side case is kept in its locked state with respect to the base-side case. Conversely when the cam member is rotated in the opposite rotational direction against the spring force of the lock springs, the external toothed portion of each of the lock tooth blocks is de-meshed from the internal toothed portion of the arm-side case. With the external and internal toothed portions de-meshed from each other, the arm-side case is in its unlocked state with respect to the base-side case. A pair of axially-protruded tooth-block receiving portions are provided in close proximity to both circumferential ends of each of the lock tooth blocks, so as to function as a tooth-block guide, permitting oscillating motion of the associated lock tooth block, and also to function to prevent relative rotation of the arm-side case to the base-side case in the two opposite rotational directions by the lock tooth blocks whose external toothed portions are in meshed-engagement with the respective arm-side case internal toothed portions. On the one hand, formed on the inside face of the base-side case are the tooth-block supporting portion pair (the tooth-block pivot pair), the two tooth-block receiving portion pairs (the two tooth-block guide pairs), and a pair of lock-spring supporting protrusions to which the innermost end portions of the respective lock springs are hooked. On the other hand, formed on the outside face of the base-side case are circumferentially-spaced four circular attachment protrusions, which protrusions are inserted into respective attachment holes of the base bracket when assembling, and a pair of circumferentially-spaced diametrically-opposed protrusions (hereinafter called "spring accommodation protrusions") which protrude from the outside face of the base-side case and by which a pair of diametrically-opposed spring accommodation recesses are necessarily defined on the inner peripheral wall surface of the base-side case. The previously-discussed plural protrusions, each formed on either the inside face or the outside face of the base-side case, are formed or shaped by pressing (exactly, half-blanking). In pressing protrusions and/or recesses in the same base-side case, it is difficult that one (e.g., the lock-spring supporting protrusion onto which the innermost end portion of the lock spring is hooked) of the two different protrusions, protruding in the two opposite directions, is formed within the same area of the base-side case in a manner so as to be superimposed on the other protrusion (e.g., the spring accommodation protrusion protruding from the outside face of the base-side case). Taking account of the strengths of the two cases, for instance, the mechanical strength of the base-side case, increasing a mechanical strength of the tooth-block supporting portion (the tooth-block pivot) usually requires a trade-off in mechanical strength of the attachment protrusions (hereinafter referred to as "anti-rotation protrusions") serving to prevent undesirable rotary motion of the base-side case relative to the base bracket. In recent years, it would be desirable to provide a seat reclining device configured to balance two contradictory requirements, namely, an increased mechanical strength from the viewpoint of safety and a more compact installation from the viewpoint of increased seat-layout flexibility. In the case of the seat reclining device, disclosed in JP2008-212176, for the same area as the spring accommodation protrusion, protruding from the outside face of the base-side case, in other words, the spring accommodation recess necessarily formed on the opposite side (i.e., the backface) of the spring accommodation protrusion, the lock-spring supporting protrusion, protruding from the inside face of the base-side case, is formed substantially at a center of the spring accommodation recess. As set forth above, the lock spring is installed in this spring accommodation recess, and thus there is a drawback of the greatly-limited shape in lateral cross section of the lock-spring supporting protrusion.

To avoid this, Japanese Patent Provisional Publication No. 8-253063 (hereinafter is referred to as "JP8-253063"), corresponding to U.S. Pat. No. 5,681,086, teaches a different spring supporting structure for a lock spring. In the vehicle seat articulation disclosed in JP8-253063, three coiled torsion springs are provided so as to force three lock tooth blocks radially outwards, that is, toward their locked positions (meshed-engagement positions) via a central cam member. One end (a straight short hook) of each of the torsion springs is kept in abutted-engagement with one of the two opposing circumferential end faces of one of two circumferentially adjacent boss pairs, each boss pair corresponding to tooth-block guides. The other end (a radially-inward two-step bending hook) of the torsion spring is kept in engagement with the cam member. The outer circumference of the winding portion of the torsion spring is supported by the two circumferentially adjacent bosses, such that the winding portion of the torsion spring is partly sandwiched between the two adjacent bosses. Thus, the spring supporting structure as disclosed in JP8-

253063 eliminates the necessity of the lock-spring supporting protrusion as disclosed in JP2008-212176.

However, each of the three boss pairs is formed to protrude from the inside face of a fixed metal flange (corresponding to the base-side case), which flange is integral with the framework of the seat part, and arranged close to the circumference of the fixed metal flange. Also formed to protrude from the outside face of the fixed metal flange are circumferentially-spaced attachment protrusions (i.e., "anti-rotation protrusions"), which protrusions are inserted into respective attachment holes of a base bracket (to which the fixed metal flange is attached) to prevent undesirable rotary motion of the fixed metal flange relative to the base bracket. In order to enhance a mechanical strength, concretely, to increase a moment created by the fitting portions of the attachment protrusions ("anti-rotation protrusions") of the fixed metal flange and the attachment holes of the base bracket, which moment counteracts or prevents undesirable rotary motion of the fixed metal flange relative to the base bracket, it is desirable to arrange the attachment protrusions ("anti-rotation protrusions") in close proximity to the circumference of the fixed metal flange, as much as possible. However, this leads to another problem of overlapping of the boss, protruding from the inside face of the fixed metal flange, with the attachment protrusions ("anti-rotation protrusions"), protruding from the outside face of the fixed metal flange. Hence, in the vehicle seat articulation disclosed in JP8-253063, the attachment protrusions ("anti-rotation protrusions"), protruding from the outside face of the fixed metal flange, are arranged to be offset radially inwards from the boss, protruding from the inside face of the fixed metal flange. This radially-inward layout of the attachment protrusions ("anti-rotation protrusions") is inferior in increased mechanical strength (i.e., increased counteracting moment).

Thus, in order to balance an increased mechanical strength and an increased seat-layout flexibility, it would be desirable to provide a vehicle seat reclining device having a more improved spring supporting structure.

SUMMARY OF THE INVENTION

It is, therefore, in view of the previously-described disadvantages of the prior art, an object of the invention to provide a vehicle seat reclining device having a spring supporting structure configured to balance an increased mechanical strength and an increased seat-layout flexibility (a more compact installation), while realizing a radially-outward layout of attachment protrusions ("anti-rotation protrusions") of a stationary flange member, which protrusions are inserted into respective attachment holes of a base bracket to prevent undesirable rotary motion of the stationary flange member relative to the base bracket.

In order to accomplish the aforementioned and other objects of the present invention, a vehicle seat reclining device comprises a stationary member, a movable member having an internal toothed portion, a plurality of lock tooth blocks, each having an external toothed portion meshable with the internal toothed portion, a cam configured to be in cam-connection with each of the lock tooth blocks, a coiled torsion spring provided to bias the cam in a locked direction that the external toothed portion meshes with the internal toothed portion, and an operating lever configured to rotate the cam against a spring force of the coiled torsion spring in an unlocked direction that the external toothed portion demeshes from the internal toothed portion, wherein a plurality of guide protrusion pairs are formed integral with an inside face of the stationary member, for guiding the respective lock tooth blocks, wherein two opposing circular-arc concave portions are formed on two opposing faces of two circumferentially adjacent sets selected out of the plurality of guide protrusion pairs, wherein a circumferential space between the two opposing circular-arc concave portions is dimensioned to be wider on a radially outward side so as to define a spring accommodation space for the coiled torsion spring on the radially outward side, and dimensioned to be narrower on a radially inward side so as to form convex portions, circumferentially opposed to each other, on the radially inward side, wherein the coiled torsion spring has a pair of engagement portions formed by outwardly bending both ends of a winding portion and configured to engage with the respective convex portions under preload, and one of the engagement portions is further configured to have a spring-force application portion hooked to the cam for permanently forcing the cam in the locked direction, and wherein an anti-rotation protrusion is formed on an outside face of the stationary member at a specified position conforming to the spring accommodation space.

According to another aspect of the invention, an assembling method for a vehicle seat reclining device employing a stationary member, a movable member having an internal toothed portion, a plurality of lock tooth blocks, each having an external toothed portion meshable with the internal toothed portion, a coiled torsion spring for biasing a cam in a locked direction that the external toothed portion meshes with the internal toothed portion, and an operating lever for rotating the cam against a spring force of the coiled torsion spring in an unlocked direction that the external toothed portion demeshes from the internal toothed portion, wherein a plurality of guide protrusion pairs are formed integral with an inside face of the stationary member, for guiding the respective lock tooth blocks, two opposing circular-arc concave portions are formed on two opposing faces of two circumferentially adjacent sets selected out of the plurality of guide protrusion pairs, a circumferential space between the two opposing circular-arc concave portions is dimensioned to be wider on a radially outward side so as to define a spring accommodation space for the coiled torsion spring on the radially outward side, and dimensioned to be narrower on a radially inward side so as to form convex portions, circumferentially opposed to each other, on the radially inward side, the coiled torsion spring has a pair of engagement portions formed by outwardly bending both ends of a winding portion and configured to engage with the respective convex portions under preload, and one of the engagement portions is further configured to have a spring-force application portion hooked to the cam for permanently forcing the cam in the locked direction, and an anti-rotation protrusion is formed on an outside face of the stationary member at a specified position conforming to the spring accommodation space, the method comprises disposing the pair of engagement portions between the respective convex portions and installing the lock tooth blocks and the cam in the stationary member, under a compressed state where the engagement portions of the coiled torsion spring are twisted and compressed in a direction that the engagement portions move toward each other, and installing the movable member on the stationary member under a condition where each of the lock tooth blocks has been moved to the unlocked direction, while pushing the spring-force application portion against the spring force of the coiled torsion spring by rotating the cam in the unlocked direction, after having installed the pair of engagement portions between the respective convex portions and after having installed the lock tooth blocks and the cam in the stationary member, under the compressed state.

The other objects and features of this invention will become understood from the following description with reference to the accompanying drawings.

DESCRIPTION OF THE PREFERRED EMBODIMENTS

Figure 7:
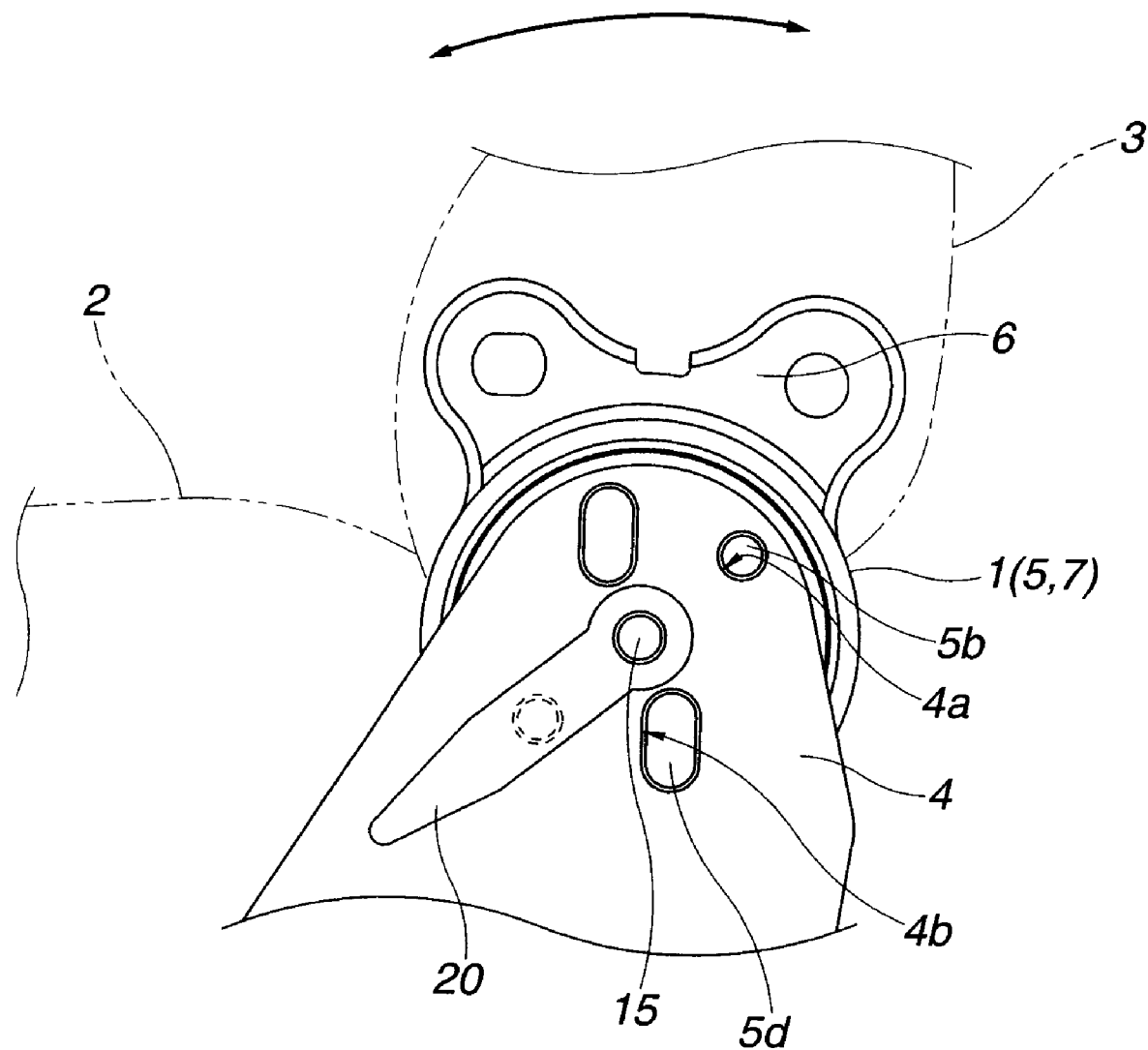
FIG. 7 is an assembled view of the seat reclining device of the embodiment, wherein the seat reclining device assembly is installed on a car seat.

Referring now to the drawings, particularly to FIG. 7, the vehicle seat reclining device of the embodiment is exemplified in a car seat. This seat includes a seat cushion 2 serving as a seat part, and a seatback 3 installed on seat cushion 2 in such a manner as to pivot with respect to the seat cushion in a fore-and-aft direction of the car. A substantially disk-shaped machine frame (hereinafter is referred to as "stationary flange member") 5 is connected via a base bracket 4 to the framework of the seat cushion side, whereas a substantially disk-shaped side cover (hereinafter is referred to as "movable flange member") 7 is connected via an arm bracket 6 to the framework of the seatback side. A return spring (not shown) is provided to permanently force and incline or pivot the seatback 3 with respect to the seat cushion 2 forwardly of the vehicle (leftwards, viewing FIG. 7).

The previously-noted stationary flange member 5 and movable flange member 7 construct the vehicle seat reclining device 1 of the embodiment. The detailed structure of vehicle seat reclining device 1 is hereunder described in reference to FIGS. 1-7. As seen from the cross section of FIG. 2, a circular recessed portion 5a is formed in the stationary flange member 5 by pressing, exactly, by half-blanking a disk (e.g., a metal plate material) from its inside. A circular recessed portion 7e is formed in the movable flange member 7 by bending the circumference of a disk (e.g., a metal plate material) into a flanged shape with a bending angle of 90 degrees by way of forging. The circular recessed portion 7e has an internal toothed portion 7a formed on its inner periphery. The circumference of the movable flange member 7 is fitted to the inner peripheral wall surface of the circular recessed portion 5a of the stationary flange member 5 by way of loose fit (or clearance fit), such that the axis of the disc-shaped movable flange member 7 is coaxially-arranged with the axis of the disk-shaped stationary flange member 5 and that relative rotation of the movable flange member 7 to the stationary flange member 5 is permitted. The outer circumference of the stationary flange member 5 and the outer circumference of the movable flange member 7 are assembled to each other by means of a ring-shaped holder 8. In more detail, the stationary flange member 5 and the movable flange member 7 are retained against one another with the ring-shaped holder 8, such that relative rotation of the movable flange member 7 to the stationary flange member 5 is permitted, while preventing the two flange members 5 and 7 from being axially spaced apart from each other, in other words, while restricting relative axial movement of these flange members 5 and 7 and maintaining coaxial arrangement of them. A cam 9 is rotatably disposed in an internal space defined by the stationary flange member 5 and the movable flange member 7 and arranged axially midway between the two flange members 5 and 7. As clearly seen in FIG. 1, a pair of circumferentially-spaced diametrically-opposed lock tooth blocks 10, 10 are pivotably disposed in the internal space of the two flange members 5 and 7, while sandwiching the cam 9 between the lock tooth blocks 10, 10 in the radial direction.

A pair of substantially columnar (barrel-shaped) axial protrusions 11, 11 are formed integral with the stationary flange member 5. Each of the axial protrusions 11, 11 has an intermediate curved guide face 11a contoured to pivotably guide the associated lock tooth block 10 along a specified circular-arc orbit and facing radially inwards (toward a central serrated hole 9e, described later) of the cam 9, in other words, located inside of the circular-arc orbit of the lock tooth block 10. Also, two pairs of guide protrusions (12A, 12B; 12A, 12B), each pair (12A, 12B) provided to guide the associated lock tooth block 10 in its oscillating motion along the specified circular-arc orbit, are formed integral with the stationary flange member 5. Each of the guide protrusion pairs is comprised of a first guide protrusion 12A and a second guide protrusion 12B. The first and second guide protrusions 12A-12B are formed integral with the stationary flange member 5 in such a manner as to circumferentially sandwich the associated lock tooth block 10 therebetween near both ends of the circular-arc orbit along which the associated lock tooth block 10 can be pivotably guided. The first guide protrusion 12A is formed with a first lock-tooth-block circular-arc-orbit outer peripheral curved guide face 12a (hereinafter is referred to as "first guide face 12a"), whereas the second guide protrusion 12B is formed with a second lock-tooth-block circular-arc-orbit outer peripheral curved guide face 12b (hereinafter is referred to as "second guide face 12b"). On the other hand, the lock tooth block 10 is formed with a sliding circular-arc-orbit inner peripheral curved face 10c (hereinafter is referred to as "inner peripheral curved face 10c"), a first sliding circular-arc-orbit outer peripheral curved face 10a (hereinafter is referred to as "first curved face 10a"), and a second sliding circular-arc-orbit outer peripheral curved face 10b (hereinafter is referred to as "second curved face 10b"). The inner peripheral curved face 10c is kept in sliding-contact with the intermediate curved guide face 11a of the axial protrusion 11. The first curved face 10a is kept in sliding-contact with the first guide face 12a, whereas the second curved face 10b is kept in sliding-contact with the second guide face 12b.

To permit pivotal motion (oscillating motion) of the lock tooth block 10 along the specified circular-arc orbit, the inner peripheral curved face 10c, the first guide face 12a, the second guide face 12b, the first curved face 10a, and the second curved face 10b are formed as circular arcs substantially coaxially-arranged with respect to the center of curvature of the intermediate curved guide face 11a of the axial protrusion 11. Regarding the lock tooth block 10, which is movable or pivotable along the specified circular-arc orbit, the lock tooth block 10 has an external toothed portion 10d formed on its outer periphery, facing the internal toothed portion 7a of the circular recessed portion 7e of the movable flange member 7. In a locked state of the vehicle seat reclining device 1, the external toothed portion 10d is kept in meshed-engagement with the internal toothed portion 7a. A recess 10f is formed substantially at a circumferential intermediate position of the lock tooth block 10 on the outside of the specified circular-arc orbit (i.e., on the opposite side of the inner peripheral curved face 10c). The lock tooth block 10 has two cam-operated ridged portions formed on both sides of the lock-tooth-block recess 10f. As can be seen from the partial cross-section of FIG. 1, the anticlockwise cam-operated ridged portion, formed on the anticlockwise side of the recess 10f, can be brought into cam-connection with a locking cam-contour surface 9a of the cam 9, when shifting the vehicle seat reclining device 1 to its locked state (see FIG. 1). Conversely when shifting the vehicle seat reclining device 1 to its unlocked state, the clockwise cam-operated ridged portion, formed on the clockwise side of the recess 10f, can be brought into cam-connection with an unlocking cam-contour surface 9b of the cam 9 (see FIG. 6).

In order to cause oscillating motion of the lock tooth block 10, exactly, movement of the external toothed portion 10d of the lock tooth block 10 into meshed-engagement with the internal toothed portion 7a of the movable flange member 7, the previously-discussed central cam 9 is provided. By virtue of anticlockwise rotation (viewing FIG. 1) of the cam 9 about the geometrical center of the central serrated hole 9e (in other words, the axis of rotation of the cam 9), the anticlockwise cam-operated ridged portions, formed on the anticlockwise side of each of the recesses 10f, 10f of the two lock tooth blocks 10, 10, can be brought into cam-connection with respective locking cam-contour surfaces 9a, 9a of cam 9, and thus the lock tooth block pair (10, 10) can be forced radially outwards, and as a result the external toothed portions 10d, 10d of the lock tooth block pair (10, 10) can be brought into meshed-engagement with the internal toothed portion 7a. Conversely by virtue of clockwise rotation (viewing FIG. 6) of the cam 9 about the geometrical center of the central serrated hole 9e, the clockwise cam-operated ridged portions, formed on the clockwise side of each of the recesses 10f, 10f of the two lock tooth blocks 10, 10, can be brought into cam-connection with respective unlocking cam-contour surfaces 9b, 9b of the cam 9, and thus the lock tooth block pair (10, 10) can be forced or pushed radially inwards, and as a result the external toothed portions 10d, 10d of the lock tooth block pair (10, 10) can be brought out of meshed-engagement with the internal toothed portion 7a. With the external toothed portions 10d, 10d of the lock tooth block pair and the internal toothed portion 7a meshed with each other, rotary motion of the movable flange member 7 with respect to the stationary flange member 5 is restricted and therefore the angular position of the seatback 3 relative to the seat cushion 2 can be held at a predetermined angular position (a vehicle-occupant's intended inclination angle).

Figure 1:
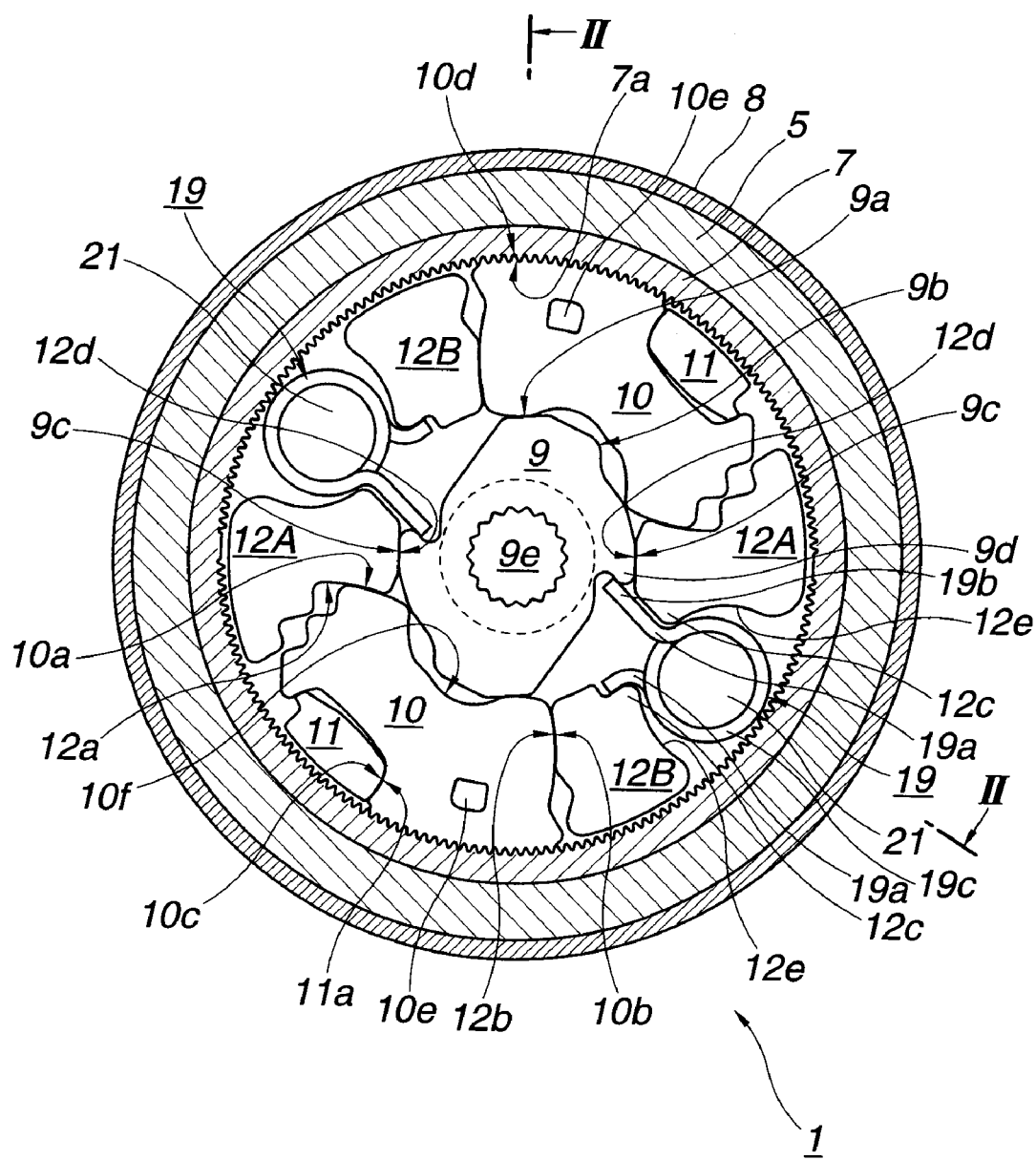
FIG. 1 is a partial cross-sectional view illustrating an embodiment of a vehicle seat reclining device, taken along the line I-I of FIG. 2.
Figure 6:
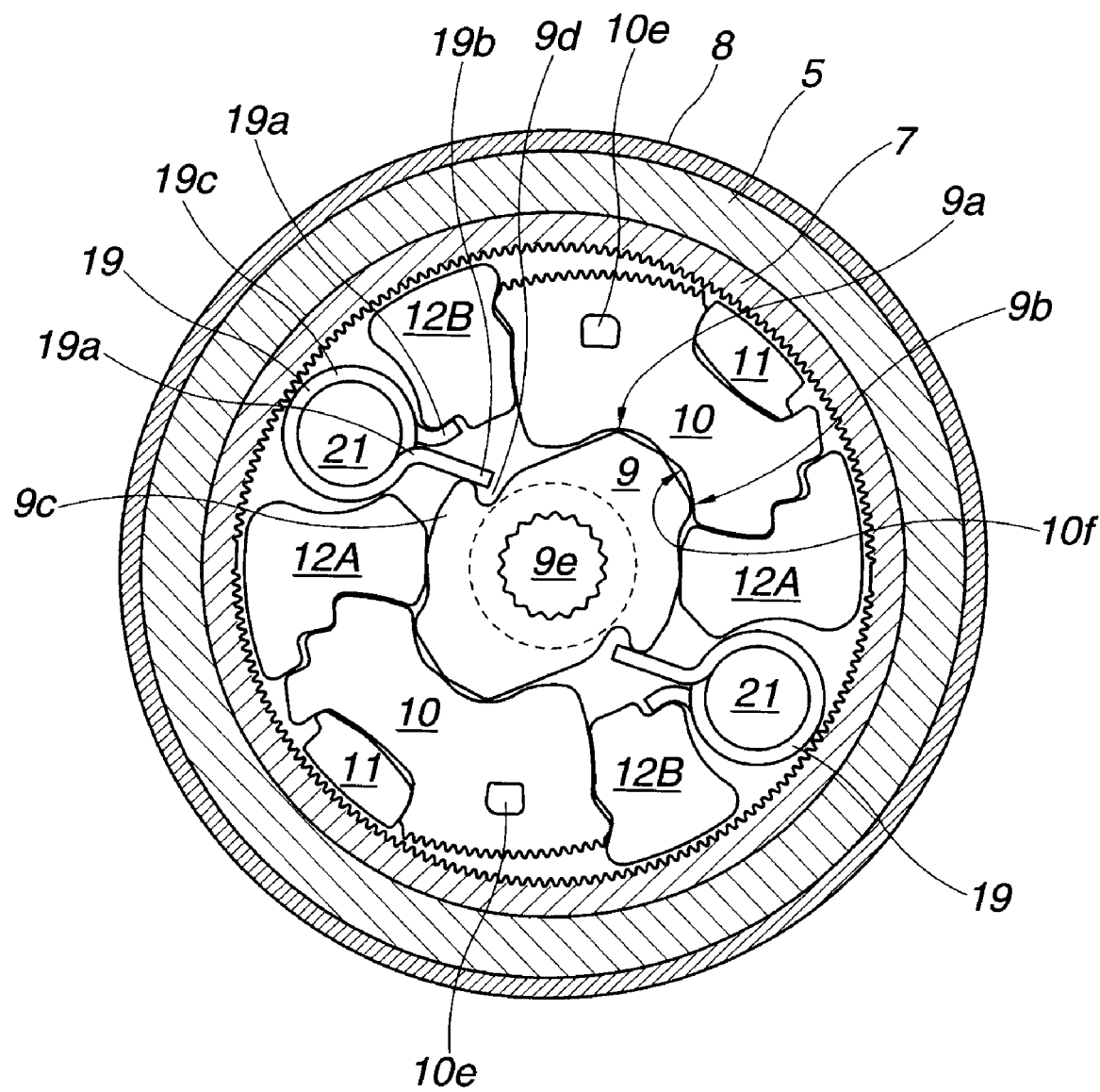
FIG. 6 is an explanatory view illustrating the operation of the seat reclining device of the embodiment.

As discussed above, regarding the cam profile, the cam 9 has the locking cam-contour surface 9a and the unlocking cam-contour surface 9b, both continuously formed on its outer periphery. The locking cam-contour surface 9a is provided to cause clockwise oscillating motion of the lock tooth block 10 along its specified circular-arc orbit so as to bring each of the external toothed portions 10d, 10d into meshed-engagement with the internal toothed portion 7a. On the contrary, the unlocking cam-contour surface 9b is provided to cause anticlockwise oscillating motion of the lock tooth block 10 along its specified circular-arc orbit so as to bring each of the external toothed portions 10d, 10d out of meshed-engagement with the internal toothed portion 7a. In FIG. 1, the first guide protrusion 12A (located on the left-hand side, viewing FIG. 1) of the first guide protrusion pair (12A, 12B), associated with the lower lock tooth block 10, is formed with a sliding-contact face 12d configured parallel to the line segment interconnecting the midpoints of the two locking cam-contour surfaces 9b, 9b being point-symmetrical with respect to the geometrical center of the central serrated hole 9e of the cam 9. In a similar manner, the first guide protrusion 12A (located on the right-hand side, viewing FIG. 1) of the second guide protrusion pair (12A, 12B), associated with the upper lock tooth block 10, is formed with a sliding-contact face 12d configured parallel to the line segment interconnecting the midpoints of the two locking cam-contour surfaces 9b, 9b being point-symmetrical with respect to the geometrical center of the central serrated hole 9e. In order to permit rotary motion of the cam 9 while restricting leftward or rightward displacement of the cam 9, the cam 9 is also formed with a pair of sliding outer peripheral surfaces 9c, 9c in sliding-contact with respective sliding-contact faces 12d, 12d of the left and right first guide protrusions 12A, 12A. Each of the sliding outer peripheral surfaces 9c, 9c is contoured along the circular arc (or the circle) with the center identical to the geometrical center of the central serrated hole 9e. In other words, the center of curvature of each of the sliding outer peripheral surfaces 9c, 9c is contoured to be identical to the geometrical center of the central serrated hole 9e. As shown in FIGS. 1 and 6, when assembled, the sliding outer peripheral surfaces 9c, 9c of the cam 9 are kept in permanently sliding-contact with respective sliding-contact faces 12d, 12d of the left and right first guide protrusions 12A, 12A, regardless of whether the vehicle seat reclining device 1 is kept in its locked state or its unlocked state, such that leftward or rightward displacement of the cam 9 can be restricted and rotary motion of the cam 9 can be permitted. In FIG. 1, the upper half of the cam 9 has a first group of locking cam-contour surface 9a, unlocking cam-contour surface 9b, and sliding outer peripheral surface 9c, continuously formed on the outer periphery of the cam 9, in that order. In a similar manner, the lower half of the cam 9 has a second group of locking cam-contour surface 9a, unlocking cam-contour surface 9b, and sliding outer peripheral surface 9c, continuously formed on the outer periphery of the cam 9, in that order. Also, the cam 9 has a stepped spring hanger 9d formed by cutting out the clockwise end of the sliding outer peripheral surface 9c in a stepped fashion.

Details of the internal structure of the vehicle seat reclining device 1 of the embodiment are hereunder described.

Figure 5:
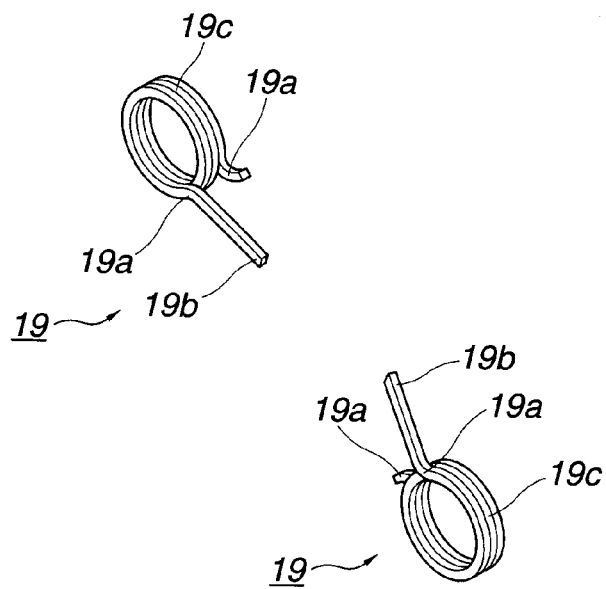
FIG. 5 is a perspective view of a pair of coiled torsion springs of the seat reclining device of the embodiment.

As seen in FIGS. 1, 3, 4, and 6, in the shown embodiment, in order to match the number of the guide protrusion pairs with the two lock tooth blocks 10, 10, the two guide protrusion pairs (12A, 12B; 12A, 12B) are formed, that is, the number of the guide protrusion pairs is also "2". As clearly shown in FIG. 1, two circumferentially opposing circular-arc concave portions 12e, 12e are formed on two circumferentially opposing faces of the first guide protrusion 12A of one (e.g., the first guide protrusion pair, associated with the lower lock tooth block 10) of two circumferentially adjacent sets of the guide protrusion pairs and the second guide protrusion 12B of the other (e.g., the second guide protrusion pair, associated with the upper lock tooth block 10) of the two circumferentially adjacent sets. The circumferential space between the two opposing circular-arc concave portions 12e, 12e is dimensioned to be wider on the radially outward side. In other words, the circumferential space between the two opposing circular-arc concave portions 12e, 12e is dimensioned to be narrower on the radially inward side. Hence, a substantially semi-circular spring accommodation space 21 is defined between the two opposing circular-arc concave portions 12e, 12e and arranged in close proximity to the circumference of the stationary flange member 5, that is, on the radially outward side, and thus the first guide protrusion 12A and the second guide protrusion 12B, circumferentially opposed to each other, have respective convex portions 12c, 12c, circumferentially opposed to each other and formed on the radially inward side. A cylindrical winding portion 19c of the coiled torsion spring 19 is installed in the spring accommodation space 21 such that the centerline of the coiled torsion spring 19 is substantially parallel to the axis of rotation of the cam 9. As seen from the perspective view of the coiled torsion spring pair 19, 19, of FIG. 5, a pair of engagement portions 19a, 19a are formed by outwardly bending both ends of each of the winding portions 19c, 19c of the coiled torsion springs 19, 19. Each of the coiled torsion springs 19, 19 is installed in the associated spring accommodation space 21 under preload (under a slightly twisted state) where the engagement portions 19a, 19a of the ends of the winding portion 19c of the coiled torsion spring 19 are slightly twisted and slightly closed (slightly compressed). Hence, the engagement portions 19a, 19a of the coiled torsion spring 19 engage with respective convex portions 12c, 12c of the first guide protrusion 12A and the second guide protrusion 12B, circumferentially opposed to each other, under preload (under a slightly twisted state). With the engagement portions 19a, 19a engaged with respective convex portions 12c, 12c under preload, the coiled torsion spring 19 can be retained or positioned in place between the first guide protrusion 12A and the second guide protrusion 12B, circumferentially opposed to each other. As best seen in FIGS. 1 and 5, a first one of the engagement portions 19a, 19a of the coiled torsion spring 19 is formed as a long hook whose root engages with the convex portion 12c of the first guide protrusion 12A under preload, whereas the second engagement portion is formed as a short hook engaging with the convex portion 12c of the second guide protrusion 12B. The long hook (the first engagement portion 19a) is configured to extend radially inwards to such an extent that the tip of the long hook can be further engaged with or hooked onto the spring hanger 9d of the cam 9, such that the cam 9 is permanently forced in its one rotation direction (i.e., anticlockwise about the rotation axis of the cam 9, viewing FIG. 1), corresponding to the locked state of the seat reclining device. That is, the tip of the long hook (the first engagement portion 19a) is formed with an elongated spring-force application portion 19b, which is engaged with the spring hanger 9d of the cam 9, and by which the cam 9 is permanently forced toward its original angular position, that is, the locked direction (i.e., anticlockwise about the rotation axis of the cam 9, viewing FIG. 1).

Figure 2:
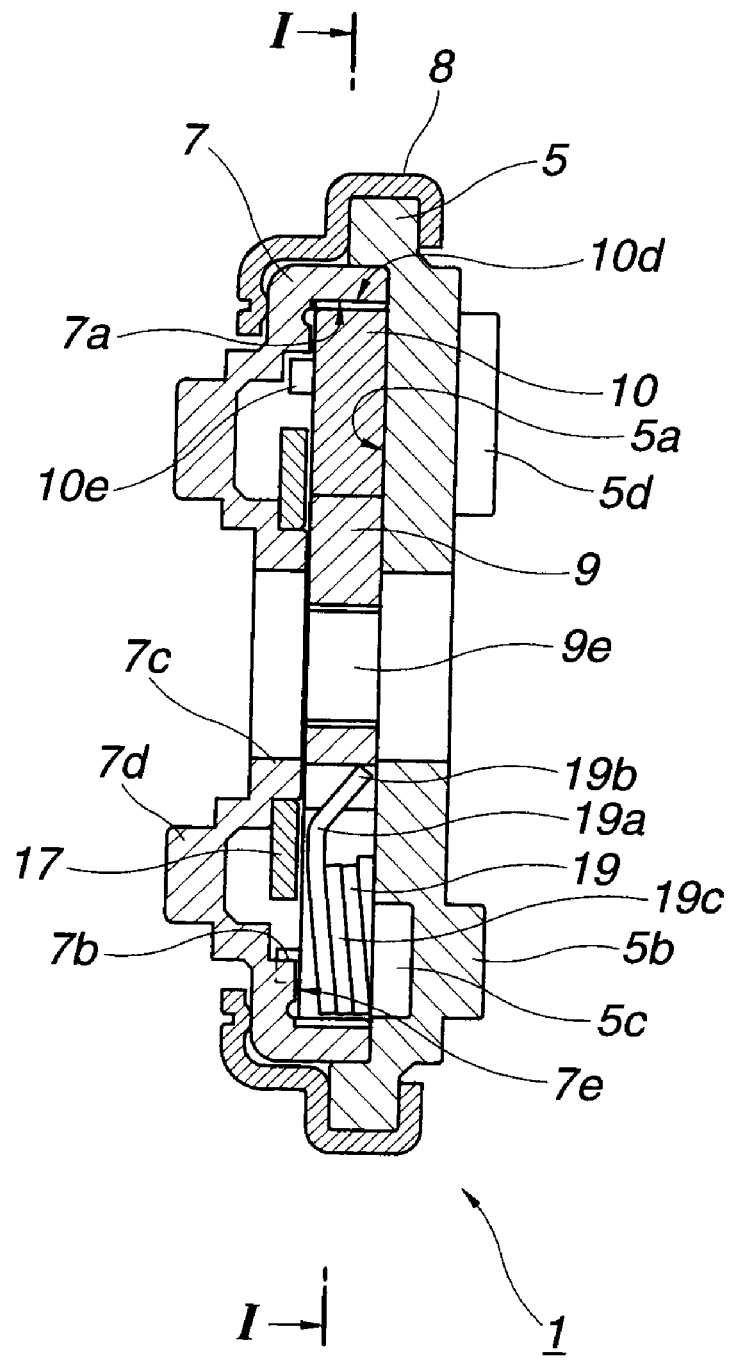
FIG. 2 is a cross section of the seat reclining device of the embodiment, taken along the line II-II of FIG. 1.

More concretely, the coiled torsion spring 19 is laid out such that the centerline of the coiled portion (the winding portion 19c) is substantially parallel to the axis of the stationary flange member 5. As can be seen from FIGS. 2 and 4, the long hook (the first engagement portion 19a), formed with the spring-force application portion 19b, is located on the side of the movable flange member 7 in the axial direction of the stationary flange member 5. As best seen in FIG. 2, the spring-force application portion 19b of the long hook (the first engagement portion 19a) is formed into a substantially boomerang shape and thus bent toward the side of the stationary flange member 5 opposite to the side of the movable flange member 7. This spring-force application portion 19b is hooked to the spring hanger 9d of the cam 9. An annular restriction member 17 is installed on the movable flange member 7, so as to restrict axial movement of the long hook (the first engagement portion 19a), formed with the spring-force application portion 19b. Concretely, the movable flange member 7 is formed at its center with the somewhat axially protruded cylindrical hollow portion 7c. The annular restriction member 17 is fitted onto the outer circumference of the cylindrical hollow portion 7c.

As seen from the perspective view of FIG. 5, the coiled torsion spring 19, which is made of a wire material having a rectangular cross section rather than a circular cross section, is used. This is because, as compared to a coiled torsion spring having a circular cross section, for the same spring stiffness, the coiled torsion spring 19 having a rectangular cross section can realize both of shortened axial length and increased cross section. By virtue of the coiled torsion spring 19 whose wire material has such a rectangular cross section, it is possible to shorten the axial length of the coiled torsion spring 19, thus reducing the axial size of the vehicle seat reclining device 1 and increasing torque imparted to the cam 9 and produced by the coiled torsion spring 19.

As can be seen from the assembled view of FIG. 7, an operating shaft 15 is fixedly connected into the central serrated hole 9e of the cam 9 by press-fitting. An operating lever 20 is also mounted on the outermost end of the operating shaft 15.

As clearly shown in FIGS. 2 and 7, an anti-rotation protrusion (an attachment protrusion) 5b is formed at a specified position of the outside face of the stationary flange member 5, conforming to the spring accommodation space 21. The anti-rotation protrusion 5b of the stationary flange member 5 is fitted into an anti-rotation hole (an attachment hole) 4a formed in the base bracket 4, so as to prevent undesirable rotary motion of the stationary flange member 5 relative to the base bracket 4. Since the stationary flange member 5 is subjected to pressing (half-blanking), a recessed portion 5c is necessarily formed on the opposite side (i.e., the backface) of the anti-rotation protrusion 5b (see FIGS. 2, 3, and 4). As discussed previously, the spring accommodation space 21 is arranged in close proximity to the circumference of the stationary flange member 5 in the radial direction of the substantially disk-shaped reclining device, and thus the anti-rotation protrusion 5b, which is formed at the specified position of the outside face of the stationary flange member 5, conforming to the spring accommodation space 21, can be also laid out in close proximity to the circumference of the stationary flange member 5 in the radial direction. In the shown embodiment, the anti-rotation protrusion 5b is circular in shape. In addition to the two diametrically-opposing circular anti-rotation protrusions 5b, 5b, as clearly shown in FIG. 2, a radially-elongated elliptical anti-rotation protrusion (an attachment protrusion) 5d is formed at a specified position of the outside face of the stationary flange member 5, conforming to the lock tooth block 10 (i.e., substantially at an intermediate position between the barrel-shaped axial protrusion 11 and the second guide protrusion 12B). The anti-rotation protrusion 5d of the stationary flange member 5 is fitted into an anti-rotation hole (an attachment hole) 4b formed in the base bracket 4. Since the stationary flange member 5 is subjected to pressing (half-blanking), an elliptical recessed portion 5e is necessarily formed on the opposite side (i.e., the backface) of the anti-rotation protrusion 5d (see FIG. 3).

Figure 3:
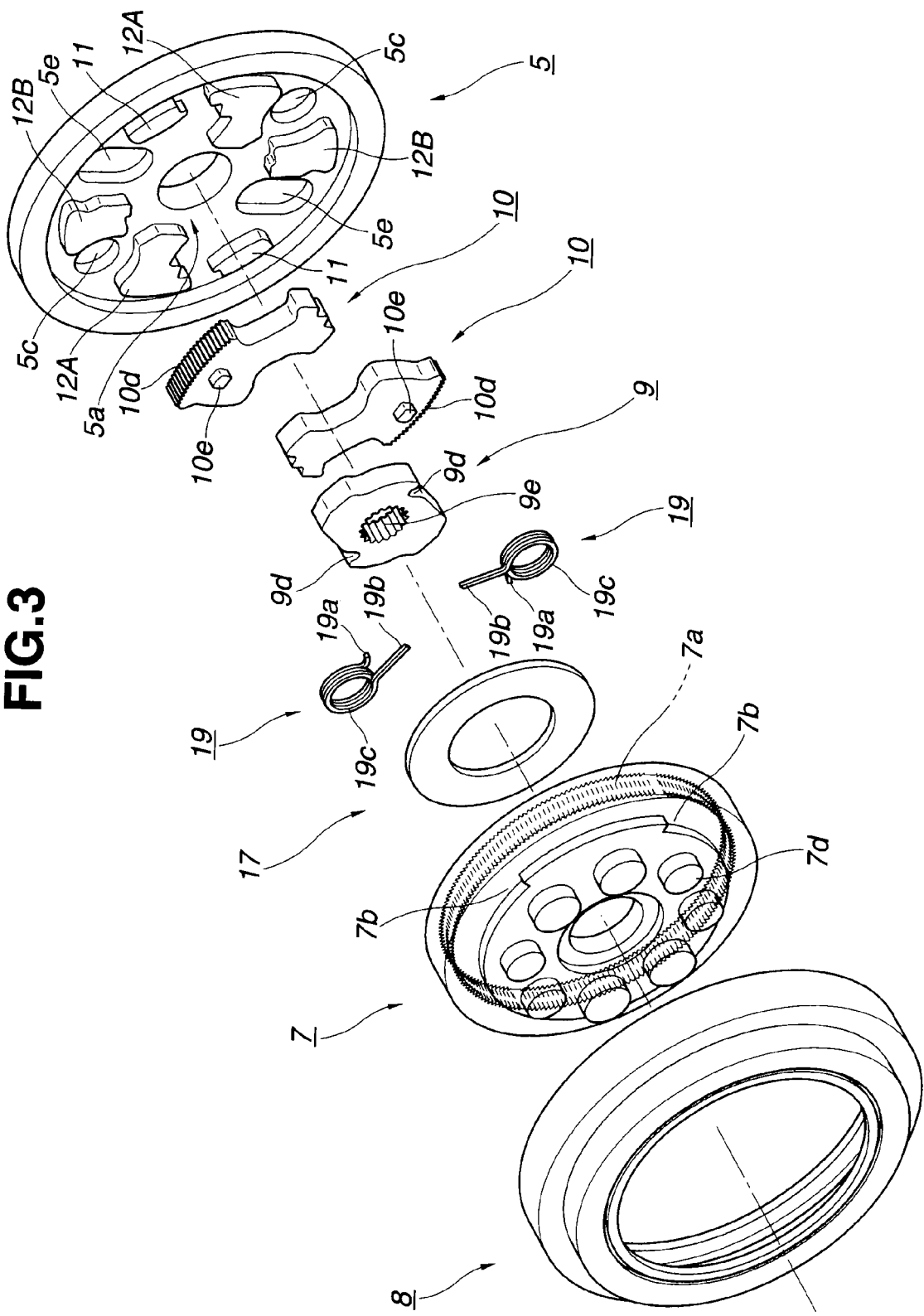
FIG. 3 is a disassembled view of the seat reclining device of the embodiment.
Figure 4:
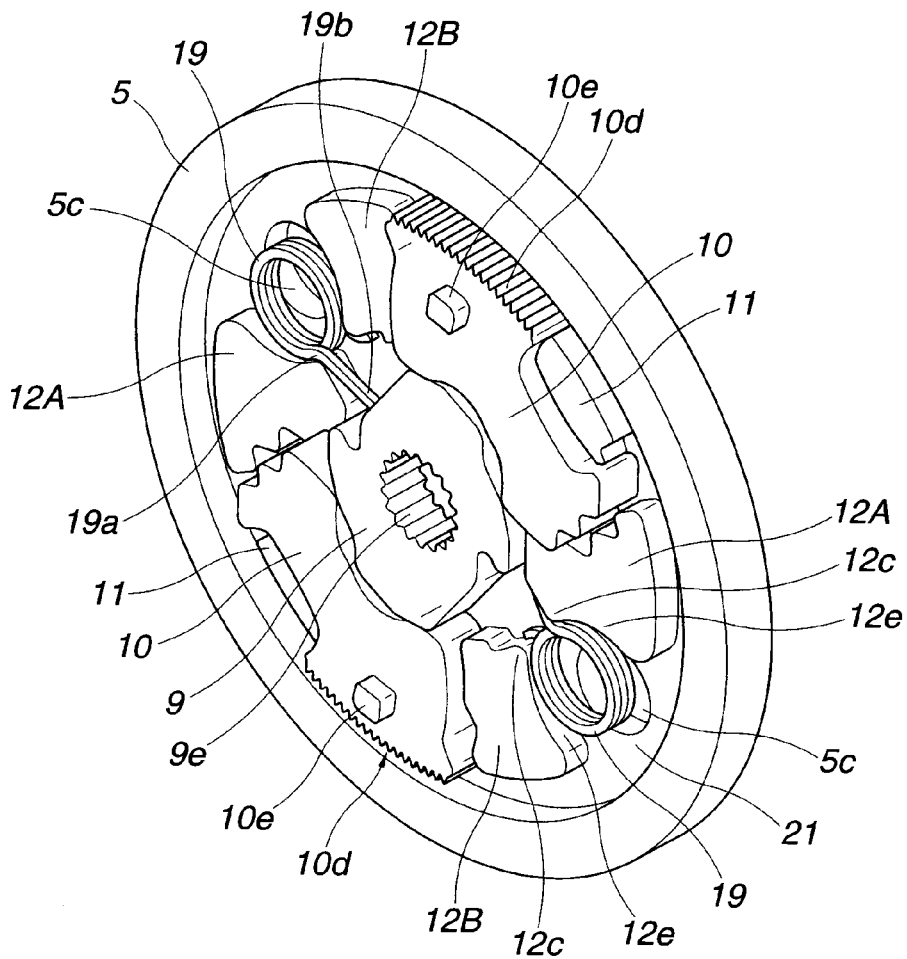
FIG. 4 is a perspective view illustrating the seat reclining device of the embodiment, wherein a side cover is removed.

Additionally, in order to set or realize seatback-lock angular positions (i.e., a seatback-lock angular range within which the seatback 3 can be locked) and seatback-unlock angular positions (i.e., a seatback-unlock angular range within which the seatback 3 can be unlocked), each of the lock tooth blocks 10, 10 has an axially-protruding stopper 10e, which slightly protrudes from one sidewall of the lock tooth block 10, facing the side of the movable flange member 7 (see FIGS. 1-4, and 7). Hence, as seen in FIGS. 2-3, a restriction portion 7b is formed on the inside face of the movable flange member 7 in order to restrict radially-outward movement of the stopper 10*e*. Additionally, a plurality of axially-protruding anti-rotation protrusions 7*d*, 7*d*, 7*d*, 7*d*, 7*d*, 7*d*, 7*d*, 7*d* are formed on the outside face of the movable flange member 7 and circumferentially equidistant-spaced from each other. These anti-rotation protrusions 7*d* of the movable flange member 7 are fitted into respective anti-rotation holes (not shown) formed in the arm bracket 6, so as to prevent undesirable rotary motion of the movable flange member 7 relative to the arm bracket 6.

(Operation)

The operation of the vehicle seat reclining device 1 is hereunder described in detail.

In an assembled state where the vehicle seat reclining device 1 is assembled to the car seat, as shown in FIG. 1, usually, the cam 9 is forced anticlockwise about its rotation axis by the spring force of the coiled torsion spring 19, and thus the lock tooth block 10 is pushed by locking the cam-contour surface 9*a* of the cam 9 and then the lock tooth block 10 oscillates clockwise along the specified circular-arc orbit, while being guided by the intermediate curved guide face 11*a*, the first guide face 12*a*, and the second guide face 12*b*. Hence, the external toothed portion 10*d* of the lock tooth block 10 is kept in meshed-engagement with the internal toothed portion 7*a* of movable flange member 7. That is, the vehicle seat reclining device 1 is conditioned in a locked state where pivotal motion of the seatback 3 to the seat cushion 2 is restricted.

In contrast, when the operating lever 20 is manually rotated clockwise (viewing FIG. 7) by the vehicle occupant and thus the operating shaft 15 is also rotated clockwise against the spring force of the coiled torsion spring 19, the cam 9 rotates clockwise about its rotation axis (see FIG. 6). Thus, the clockwise rotation of the cam 9 allows the locking cam-contour surface 9*a* to slide out of engagement with the anticlockwise cam-operated ridged portion, formed on the anticlockwise side of the recess 10*f* of the lock tooth block 10, and then the unlocking cam-contour surface 9*b* forces the clockwise cam-operated ridged portion, formed on the clockwise side of the recess 10*f* of the lock tooth block 10, anticlockwise along the specified circular-arc orbit. As a result, the lock tooth block 10 oscillates anticlockwise about the barrel-shaped axial protrusion 11 along the specified circular-arc orbit, while being guided by the three guide faces 11*a*, 12*a*, and 12*b*. Hence, the external toothed portion 10*d* of the lock tooth block 10 is demeshed from the internal toothed portion 7*a* of the movable flange member 7. That is, the vehicle seat reclining device 1 is conditioned in an unlocked state where pivotal motion of the seatback 3 to the seat cushion 2 is permitted. Under such an unlocked state, the seatback 3, together with the arm bracket 6 on which the movable flange member 7 is installed, is pivoted with respect to the seat cushion 2 forwards by the spring force of the return spring (not shown).

Under the unlocked state, assume that the seatback 3 is pivoted with respect to the seat cushion 2 backwards against the return-spring force by the vehicle occupant, and thereafter the operating lever 20 is released at a vehicle-occupant's intended seatback angular position. At this time, owing to the releasing action of the operating lever 20, the cam 9 rotates anticlockwise about its rotation axis by the spring force of the coiled torsion spring 19, and thus the locking cam-contour surface 9*a* begins to push the lock tooth block 10 again. Thus, the external toothed portion 10*d* of the lock tooth block 10 is brought into meshed-engagement with the internal toothed portion 7*a* of the movable flange member 7. In this manner, the vehicle seat reclining device 1 returns again to the locked state shown in FIG. 1.

According to the vehicle seat reclining device 1 of the embodiment, the spring accommodation space 21 is arranged on the radially outward side (i.e., close to the circumference of the substantially disk-shaped stationary flange member 5). Additionally, the spring accommodation space 21 is defined between two circumferentially adjacent sets (i.e., (i) the first guide protrusion set (12A, 12B), associated with the lower lock tooth block 10 and (ii) the second guide protrusion set (12A, 12B), associated with the upper lock tooth block 10, because of only two guide protrusion pairs (12A, 12B; 12A, 12B) exemplified in the shown embodiment), selected out of a plurality of guide protrusion pairs (i.e., (i) the first guide protrusion pair (12A, 12B), associated with the lower lock tooth block 10 and (ii) the second guide protrusion pair (12A, 12B), associated with the upper lock tooth block 10, in the shown embodiment). Additionally, the engagement portions 19*a*, 19*a*, formed at both ends of the coiled torsion spring 19, are configured to engage with respective convex portions 12*c*, 12*c*, laid out on the radially inward side of the stationary flange member 5 and respectively formed on two circumferentially opposing faces of (i) the first guide protrusion 12A of one (e.g., the first guide protrusion pair, associated with the lower lock tooth block 10) of the two circumferentially adjacent sets cooperating with each other to define the spring accommodation space 21 between them (i.e., the two adjacent sets), and (ii) the second guide protrusion 12B of the other set (e.g., the second guide protrusion pair, associated with the upper lock tooth block 10), under a preloaded state where the convex portions 12*c*, 12*c* are preloaded in such a manner as to be circumferentially spaced apart from each other by respective engagement portions 19*a*, 19*a* of the coiled torsion spring 19. Additionally, the engagement portion 19*a* of the coiled torsion spring 19, kept in engagement with the convex portion 12*c* of the first guide protrusion 12A, is also formed with the radially-elongated spring-force application portion 19*b*. The spring-force application portion 19*b* is also engaged with the spring hanger 9*d* of the cam 9. Therefore, the coiled torsion spring 19 is supported on the stationary flange member 5 and retained or held in place with three points, namely, (i) the first guide protrusion 12A of one (e.g., the first guide protrusion pair, associated with the lower lock tooth block 10) of the two circumferentially adjacent sets cooperating with each other to define the spring accommodation space 21 between them (the two adjacent sets), (ii) the second guide protrusion 12B of the other set (e.g., the second guide protrusion pair, associated with the upper lock tooth block 10), and (iii) the cam 9. When the cam 9 is rotated in its unlocked direction (i.e., clockwise about the rotation axis of cam 9) against the spring force of the coiled torsion spring 19 by the operating lever 20, the coiled torsion spring 19 is greatly twisted such that the engagement portions 19*a*, 19*a* of the ends of the winding portion 19*c* are greatly twisted and closed (see FIG. 6). Conversely when the operating lever 20 is released, the coiled torsion spring 19 is also released such that the engagement portions 19*a*, 19*a* of the ends of the winding portion 19*c* are opened but slightly twisted for preload (see FIG. 1) and thus the cam 9 rotates toward its original angular position, that is, in the locked direction (i.e., anticlockwise about the rotation axis of the cam 9 (see FIG. 1).

Furthermore, according to the vehicle seat reclining device 1 of the embodiment, the spring accommodation space 21 is arranged on the radially outward side (i.e., close to the circumference of the substantially disk-shaped stationary flange member 5), and defined between two circumferentially adjacent sets, namely, (i) the first guide protrusion set (12A, 12B), associated with the lower lock tooth block 10 and (ii) the second guide protrusion set (12A, 12B), associated with the upper lock tooth block 10. Additionally, the coiled torsion spring 19 is retained in place with three points, namely, (i) the first guide protrusion 12A of one (e.g., the first guide protrusion pair, associated with the lower lock tooth block 10) of the two circumferentially adjacent sets cooperating with each other to define the spring accommodation space 21 between them (the two adjacent sets), (ii) the second guide protrusion 12B of the other set (e.g., the second guide protrusion pair, associated with the upper lock tooth block 10), and (iii) the cam 9. Therefore, there is no necessity of a lock-spring supporting protrusion to be inserted into an internal space of a coiled torsion spring and to be individually formed on the inside face of a fixed metal flange by pressing. Hence, it is possible to lay out the anti-rotation protrusion 5b, formed on the outside face of the stationary flange member 5, at a specified position of the stationary flange member 5, conforming to the spring accommodation space 21, formed on the inside face of the stationary flange member 5. Thus, it is possible to lay out the anti-rotation protrusion 5b on the radially outward side (i.e., close to the circumference of the substantially disk-shaped stationary flange member 5). This radially-outward layout of the anti-rotation protrusion 5b is advantageous with respect to an increased mechanical strength (in other words, an increased counteracting moment). That is, the layout of the first and second guide protrusions 12A-12B, both formed on the inside face of the stationary flange member 5, and the layout of the anti-rotation protrusion 5b, formed on the outside of the stationary flange member 5, can be greatly balanced to each other. Thus, it is possible to balance two contradictory requirements, that is, high mechanical strength (high rigidity) and compact design (lightweight and high mountability or more compact installation) of the vehicle seat reclining device 1.

Also, according to the vehicle seat reclining device 1 of the embodiment, the spring-force application portion 19b of the coiled torsion spring 19, which forces the cam 9 toward its original angular position (i.e., in the locked direction), is formed into a substantially boomerang shape and bent axially toward the inside face of the stationary flange member 5. In addition to the above, the restriction member 17 is also provided to restrict axial movement of the engagement portion 19a having the spring-force application portion 19b. Therefore, it is possible to optimally maintain an appropriately engaged state between (i) the engagement portion 19a of the coiled torsion spring 19 having the spring-force application portion 19b and (ii) the convex portion 12c of the first guide protrusion 12A. In other words, it is possible to suppress the engagement portion 19a of the coiled torsion spring 19 having the spring-force application portion 19b from being undesirably disengaged from the convex portion 12c of the first guide protrusion 12A.

Moreover, according to the vehicle seat reclining device 1 of the embodiment, in a preloaded state where convex portions 12c, 12c are preloaded (spring-loaded) in such a manner as to be circumferentially spaced apart from each other by respective engagement portions 19a, 19a of the coiled torsion spring 19, the spring-force application portion 19b is positioned in place. By rotating the cam 9 in its unlocked direction (i.e., clockwise about the cam rotation axis in FIG. 6) from the preloaded state shown in FIG. 1, while keeping engagement between the cam 9 and the spring-force application portion 19b, movement of the lock tooth block 10 in the unlocked direction occurs, and thus the movable flange member 7 (exactly, the internal toothed portion 7a) can be disengaged (demeshed) from the lock tooth block 10 (exactly, the external toothed portion 10d). Under the disengaged state (the demeshed state), the movable flange member 7 can be easily installed on the stationary flange member 5. Under these conditions (that is, with the movable flange member 7 installed on or assembled to the stationary flange member 5 and with the cam 9 rotated in the unlocked direction), when torque applied to the cam 9 in the unlocked direction is released, the cam 9 returns to or rotates toward its original angular position (i.e., in the locked direction) by the spring force of the coiled torsion spring 19. Thus, the lock tooth block 10 begins to move in the locked direction, as a result the external toothed portion 10d is brought into meshed-engagement with the internal toothed portion 7a. With the cam 9 forced by the spring force of the coiled torsion spring 19 and thus held at its original angular position, rotary motion of the movable flange member 7 with respect to the stationary flange member 5 is restricted and relative angular position of the movable flange member 7 with respect to the stationary flange member 5 is locked. In this manner, an assembling work of the vehicle seat reclining device can be completed.

In the preloaded state where the convex portions 12c, 12c are preloaded (spring-loaded) in such a manner as to be circumferentially spaced apart from each other by respective engagement portions 19a, 19a of the coiled torsion spring 19, spring-force application portion 19b is positioned in place. This greatly facilitates an assembling work of vehicle seat reclining devices, thus enabling automated assembling of vehicle seat reclining devices.

In the shown embodiment, the substantially disk-shaped machine frame 5 is fixedly connected to the base bracket 4 and thus the machine frame 5 serves as a stationary flange member fixed to the base bracket 4, whereas the substantially disk-shaped side cover 7 is fixedly connected to the arm bracket 6 and thus the side cover 7 serves as a movable flange member fixed to the arm bracket 6. In lieu thereof, the substantially disk-shaped machine frame 5 may be fixedly connected to the arm bracket 6 and thus the machine frame 5 may serve as a movable flange member fixed to the arm bracket 6, whereas the substantially disk-shaped side cover 7 may be fixedly connected to the base bracket 4 and thus the side cover 7 may serve as a stationary flange member fixed to the base bracket 4.

In the shown embodiment, the vehicle seat reclining device 1 is configured such that the lock tooth block 10 moves or oscillates along a specified circular-arc orbit. In lieu thereof, the vehicle seat reclining device may be configured such that the lock tooth block 10 moves along a straight orbit that enables radial movement of the lock tooth block 10.

In the shown embodiment, only two lock tooth blocks 10, 10 are laid out in such a manner as to be circumferentially 180-degrees-spaced apart from each other. In lieu thereof, three or more lock tooth blocks may be laid out in such a manner as to be circumferentially equidistant-spaced from each other or laid out at circumferentially irregular intervals. For instance, in the case of four lock tooth blocks, four spaces defined by four lock-tooth-block guide protrusion pairs may be all used as four spring accommodation spaces for four coiled torsion springs. Alternatively, for instance, in the case of four lock tooth blocks, only two spaces, selected out of four spaces defined by four lock-tooth-block guide protrusion pairs, may be used as spring accommodation spaces for two coiled torsion springs, without installing coiled torsion springs in the remaining two spaces. In such a case, the first guide protrusion 12A of one of the two circumferentially adjacent sets, between which adjacent sets a coiled torsion spring is not installed, and the second guide protrusion 12B of the other set may be integrally formed as a single guide protrusion.

In the shown embodiment, from the viewpoint of the previously-discussed merits, that is, the shortened coiled-torsion-spring axial length and the increased spring stiffness, the cross-sectional shape of a wire material of the coiled torsion spring 19 is rectangular. It will be appreciated that the cross-sectional shape of a wire material of the coiled torsion spring 19 is not limited to such a particular cross section. In lieu thereof, as a coiled torsion spring, a wire material having a circular, square, or elliptical cross section may be used.

In the shown embodiment, the lock tooth block 10 is moved in the unlocked direction by way of cam-connection between the unlocking cam-contour surface 9b, formed on the outer circumference of the cam 9, and the cam-operated ridged portion formed on the outer circumference of the lock tooth block 10. In lieu thereof, an additional unlock plate, installed separately from the cam 9, but rotatable together with the cam 9, may be provided, such that the lock tooth block can be moved in the unlocked direction through the additional unlock plate, displaceable in synchronism with rotary motion of the cam 9.

The entire contents of Japanese Patent Application No. 2009-19398 (filed Jan. 30, 2009) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A vehicle seat reclining device comprising:
a stationary member;
a movable member having an internal toothed portion;
a plurality of lock tooth blocks, each having an external toothed portion meshable with the internal toothed portion;
a cam configured to be in cam-connection with each of the lock tooth blocks;
a coiled torsion spring provided to bias the cam in a locked direction such that the external toothed portion meshes with the internal toothed portion; and
an operating lever configured to rotate the cam against a spring force of the coiled torsion spring in an unlocked direction such that the external toothed portion demeshes from the internal toothed portion,
wherein a plurality of guide protrusion pairs are formed integral with an inside face of the stationary member, for guiding the respective lock tooth blocks,
wherein two opposing circular-arc concave portions are formed on two opposing faces of two circumferentially adjacent sets selected out of the plurality of guide protrusion pairs,
wherein a circumferential space between the two opposing circular-arc concave portions is dimensioned to be wider on a radially outward side so as to define a spring accommodation space for the coiled torsion spring on the radially outward side, and dimensioned to be narrower on a radially inward side so as to form convex portions, circumferentially opposed to each other, on the radially inward side,
wherein the coiled torsion spring has a pair of engagement portions formed by outwardly bending both ends of a winding portion and configured to engage with the respective convex portions under preload, and one of the engagement portions is further configured to have a spring-force application portion hooked to the cam for permanently forcing the cam in the locked direction, and wherein an anti-rotation protrusion is formed on an outside face of the stationary member at a specified position conforming to the spring accommodation space.

2. The vehicle seat reclining device as claimed in claim 1, wherein:
the engagement portion, formed with the spring-force application portion, is located on a side of the stationary member, axially facing the movable member, and the spring-force application portion is bent toward the inside face of the stationary member; and
a restriction member is provided at the movable member for restricting axial movement of the engagement portion formed with the spring-force application portion.

3. A vehicle seat reclining device comprising:
a base bracket adapted to be fixed to a seat cushion;
an arm bracket adapted to be fixed to a seatback and configured to be rotatable with respect to the base bracket;
a stationary member fixed to one of the base bracket and the arm bracket;
a movable member fixed to the other of the base bracket and the arm bracket so as to be rotatable with respect to the stationary member, and having an internal toothed portion formed on an inner periphery;
a plurality of lock tooth blocks, each of which is arranged axially midway between the stationary member and the movable member, and configured to be movable toward or apart from the internal toothed portion, and having an external toothed portion meshable with the internal toothed portion;
a cam configured to force each of the lock tooth blocks for bringing the external toothed portion into meshed-engagement with the internal toothed portion and for keeping the movable member in a locked relationship with the stationary member;
a coiled torsion spring provided to bias the cam in a locked direction such that the external toothed portion meshes with the internal toothed portion; and
an operating lever configured to rotate the cam against a spring force of the coiled torsion spring in an unlocked direction such that the external toothed portion demeshes from the internal toothed portion;
wherein a plurality of guide protrusion pairs are formed integral with an inside face of the stationary member, for guiding the respective lock tooth blocks,
wherein two opposing circular-arc concave portions are formed on two opposing faces of a first guide protrusion of a first one of two circumferentially adjacent sets, selected out of the plurality of guide protrusion pairs, and a second guide protrusion of the second set, the first guide protrusion of the first set and the second guide protrusion of the second set circumferentially facing each other,
wherein a circumferential space between the two opposing circular-arc concave portions is dimensioned to be wider on a radially outward side so as to define a spring accommodation space for the coiled torsion spring on the radially outward side, and dimensioned to be narrower on a radially inward side so as to form convex portions, circumferentially opposed to each other, on the radially inward side,
wherein the coiled torsion spring has a winding portion and a pair of engagement portions formed by outwardly bending both ends of the winding portion, the winding portion is installed in the spring accommodation space, the engagement portions are configured to engage with the respective convex portions under a preloaded state where the convex portions are preloaded to be circumferentially spaced apart from each other by the respective engagement portions and to retain the coiled torsion spring in place, and one of the engagement portions is further configured to have a spring-force application portion hooked to the cam for permanently forcing the cam in the locked direction, and wherein an anti-rotation protrusion is formed on an outside face of the stationary member at a specified position conforming to the spring accommodation space, and the anti-rotation protrusion is fitted into an anti-rotation hole formed in the one of the base bracket and the arm bracket.

4. A vehicle seat reclining device comprising:

a base bracket adapted to be fixed to a seat cushion;

an arm bracket adapted to be fixed to a seatback;

a stationary member fixed to one of the base bracket and the arm bracket;

a movable member fixed to the other of the base bracket and the arm bracket so as to be rotatable with respect to the stationary member, and having an internal toothed portion;

a plurality of lock tooth blocks, each disposed in an internal space defined by the stationary member and the movable member, and having an external toothed portion meshable with the internal toothed portion;

a cam configured to be in cam-connection with each of the lock tooth blocks;

a coiled torsion spring provided to bias the cam in a locked direction such that the external toothed portion meshes with the internal toothed portion; and an operating lever configured to rotate the cam against a spring force of the coiled torsion spring in an unlocked direction such that the external toothed portion demeshes from the internal toothed portion, wherein a plurality of guide protrusion pairs are formed integral with an inside face of the stationary member, for guiding the respective lock tooth blocks, wherein two opposing circular-arc concave portions are formed on two opposing faces of a first guide protrusion of a first one of two circumferentially adjacent sets, selected out of the plurality of guide protrusion pairs, and a second guide protrusion of the second set, the first guide protrusion of the first set and the second guide protrusion of the second set circumferentially facing each other, wherein a circumferential space between the two opposing circular-arc concave portions is dimensioned to be wider on a radially outward side so as to define a spring accommodation space for the coiled torsion spring on the radially outward side, and dimensioned to be narrower on a radially inward side so as to form convex portions, circumferentially opposed to each other, on the radially inward side, wherein the coiled torsion spring has a winding portion and a pair of engagement portions formed by outwardly bending both ends of the winding portion, the winding portion is installed in the spring accommodation space, the engagement portions are configured to engage with the respective convex portions under preload, and one of the engagement portions is further configured to have a spring-force application portion hooked to the cam for permanently forcing the cam in the locked direction, and wherein an anti-rotation protrusion is formed on an outside face of the stationary member at a specified position conforming to the spring accommodation space.

5. An assembling method for a vehicle seat reclining device employing a stationary member, a movable member having an internal toothed portion, a plurality of lock tooth blocks, each having an external toothed portion meshable with the internal toothed portion, a coiled torsion spring for biasing a cam in a locked direction such that the external toothed portion meshes with the internal toothed portion, and an operating lever for rotating the cam against a spring force of the coiled torsion spring in an unlocked direction such that the external toothed portion demeshes from the internal toothed portion, wherein a plurality of guide protrusion pairs are formed integral with an inside face of the stationary member, for guiding the respective lock tooth blocks, two opposing circular-arc concave portions are formed on two opposing faces of two circumferentially adjacent sets selected out of the plurality of guide protrusion pairs, a circumferential space between the two opposing circular-arc concave portions is dimensioned to be wider on a radially outward side so as to define a spring accommodation space for the coiled torsion spring on the radially outward side, and dimensioned to be narrower on a radially inward side so as to form convex portions, circumferentially opposed to each other, on the radially inward side, the coiled torsion spring has a pair of engagement portions formed by outwardly bending both ends of a winding portion and configured to engage with the respective convex portions under preload, and one of the engagement portions is further configured to have a spring-force application portion hooked to the cam for permanently forcing the cam in the locked direction, and an anti-rotation protrusion is formed on an outside face of the stationary member at a specified position conforming to the spring accommodation space, the method comprising:

disposing the pair of engagement portions between the respective convex portions and installing the lock tooth blocks and the cam in the stationary member, under a compressed state where the engagement portions of the coiled torsion spring are twisted and compressed in a direction such that the engagement portions move toward each other; and installing the movable member on the stationary member under a condition where each of the lock tooth blocks has been moved to the unlocked direction, while pushing the spring-force application portion against the spring force of the coiled torsion spring by rotating the cam in the unlocked direction, after having installed the pair of engagement portions between the respective convex portions and after having installed the lock tooth blocks and the cam in the stationary member, under the compressed state.

6. The assembling method for a vehicle seat reclining device as claimed in claim 5, wherein:

the spring-force application portion is bent toward the inside face of the stationary member; and a restriction member is provided at the movable member for restricting axial movement of the engagement portion formed with the spring-force application portion bent toward the inside face of the stationary member, which further comprises:

locating the engagement portion, formed with the spring-force application portion bent toward the inside face of the stationary member, on a side of the stationary member, axially facing the movable member.

* * * * *